United States Patent
Helmer

[11] 3,885,205
[45] May 20, 1975

[54] CONTROLLED ROTOR MOTOR

[75] Inventor: Robert Helmer, Setauket, N.Y.

[73] Assignee: The Enercon Corporation, Setauket, N.Y.

[22] Filed: Nov. 16, 1972

[21] Appl. No.: 307,013

[52] U.S. Cl. .................... 318/302; 318/360
[51] Int. Cl. ........................ H02k 17/00
[58] Field of Search .......... 318/302, 360; 242/75.51

[56] References Cited
UNITED STATES PATENTS

| | | | |
|---|---|---|---|
| 489,709 | 1/1893 | Hering | 318/360 |
| 1,828,943 | 10/1931 | Rossman | 318/360 |
| 2,022,502 | 11/1935 | Cutler | 318/360 |
| 2,061,983 | 11/1936 | Rossman | 318/360 |
| 2,246,372 | 6/1941 | Lockwood | 318/360 |
| 2,779,548 | 1/1957 | Helmer | 242/75.51 |
| 3,593,085 | 7/1971 | Decker | 318/302 |

*Primary Examiner*—Robert K. Schaefer
*Assistant Examiner*—John J. Feldhaus
*Attorney, Agent, or Firm*—Bierman & Bierman; Kenneth J. Stempler

[57] ABSTRACT

An electric motor for driving a mechanical load at variable speed and constant torque includes a stationary housing containing a magnetic field rotor driven by alternating current and surrounding a drive rotor. The rotors rotate in opposite direction when the drive rotor is coupled to a load. The motor can be of induction or synchronous type. The means for adjustably varying retardation of the field rotor and consequently the speed of the drive rotor may be by a direct current energized magnetic coercive force clutch mechanically coupled to the field rotor or by other electromechanical means connected in circuit with the field rotor.

12 Claims, 5 Drawing Figures

CONTROLLED ROTOR MOTOR

This invention relates to the art of variable speed alternating current motors, and more particularly concerns an alternating current motor of variable speed and constant driving torque.

It is well known that alternating current motors generally have a very low starting torque. If the design is modified to raise the starting torque, then the maximum torque at full speed is reduced. It is also known that alternating current motors, with the exception of some series commutator motors operate only at fixed speeds. For these reasons, direct current motors are generally used in applications such as subway and commuter trains where constant torque and variable speeds are required. The employment of direct current traction motors has proven progressively more objectionable in practice as rail systems have expanded. A large number of substations along many miles of trackage are required to provide direct current for the motors. Both first cost and annual expense of maintenance are very high.

The present invention is directed at the problem, heretofore not solved, using alternating current motors directly on alternating current distribution systems for traction systems. To this end, an alternating current motor has been devised which has a continuously variable output speed capability while being connected to a fixed frequency AC source and which provides constant maximum rated output udriving torque regardless of speed. According to the invention an induction or synchronous motor is provided with two members capable of rotating in opposite directions, i.e. a rotating stator and a drive rotor. The rotating stator may run continuously. The drive rotor is coupled to a load. Electromechanical means is provided for retarding rotation of the rotating stator which inductively causes rotation of the drive rotor. The electromechanical means may include a hardened steel ring being integral with the rotating stator and a multiplicity of fixed electro magnets juxtaposed to the said steel ring to provide a retarding force on the rotating stator.

It is therefore a principal object of the present invention to provide an alternating current motor with means to assure continuously variable output speeds and constant output torque at all speeds, when connected to an alternating current source of fixed frequency.

A further object of the present invention is to provide an alternating current motor with two oppositely rotating members namely a drive rotor and a rotating stator in a housing, the drive rotor being coupled to a load and the rotating stator being connected to an alternating current source of fixed frequency.

Another object of the present invention is to provide an alternating current motor as described, with variable electromechanical means for retarding rotation of the rotating stator, the mechanical means comprising a hardened steel ring and a multiplicity of fixed electromagnets direct current obtained from the alternating current source by rectification.

These and other objects and many of the attendant advantages of this invention will be readily appreciated as the same becomes better understood by reference to the following detailed description when considered in connection with the accompanying drawings in which.

Figure 1:
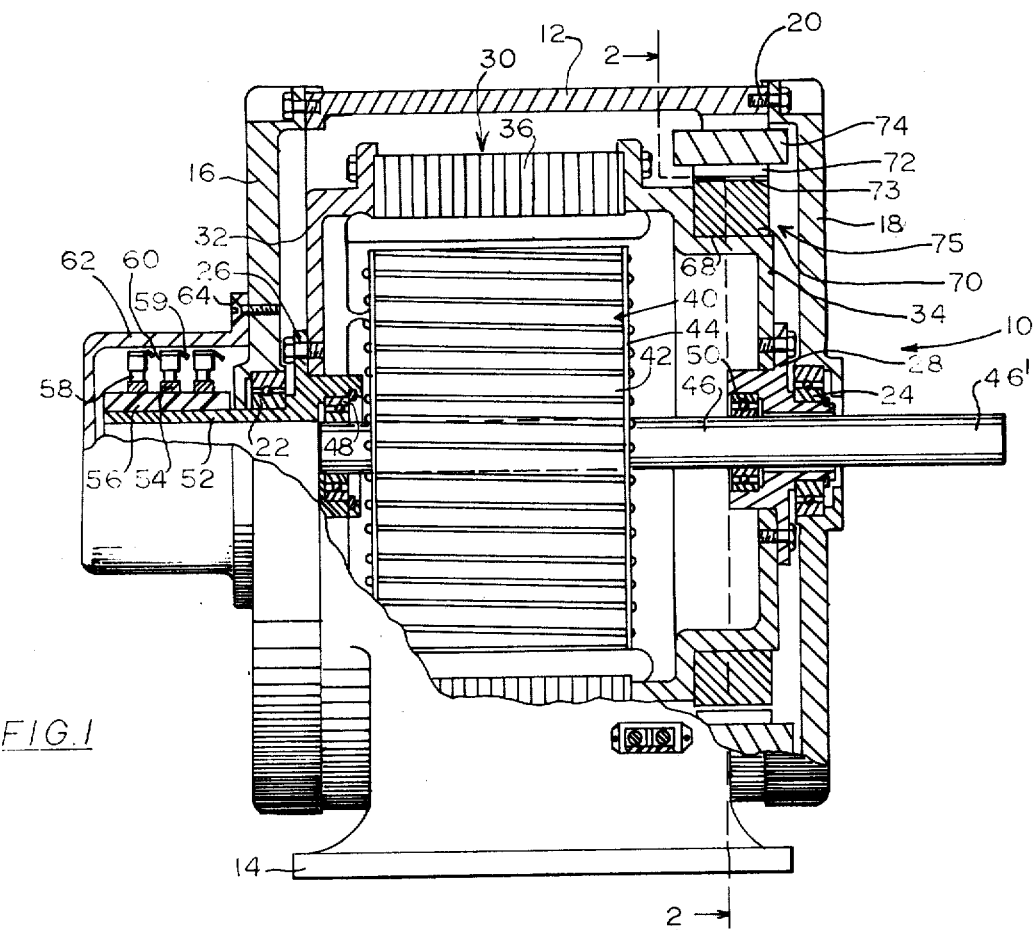
FIG. 1 is a side view partially in longitudinally section of an assembly embodying the invention, including an induction motor and an electromechanical means to provide a retarding force on the rotating stator.
Figure 2:
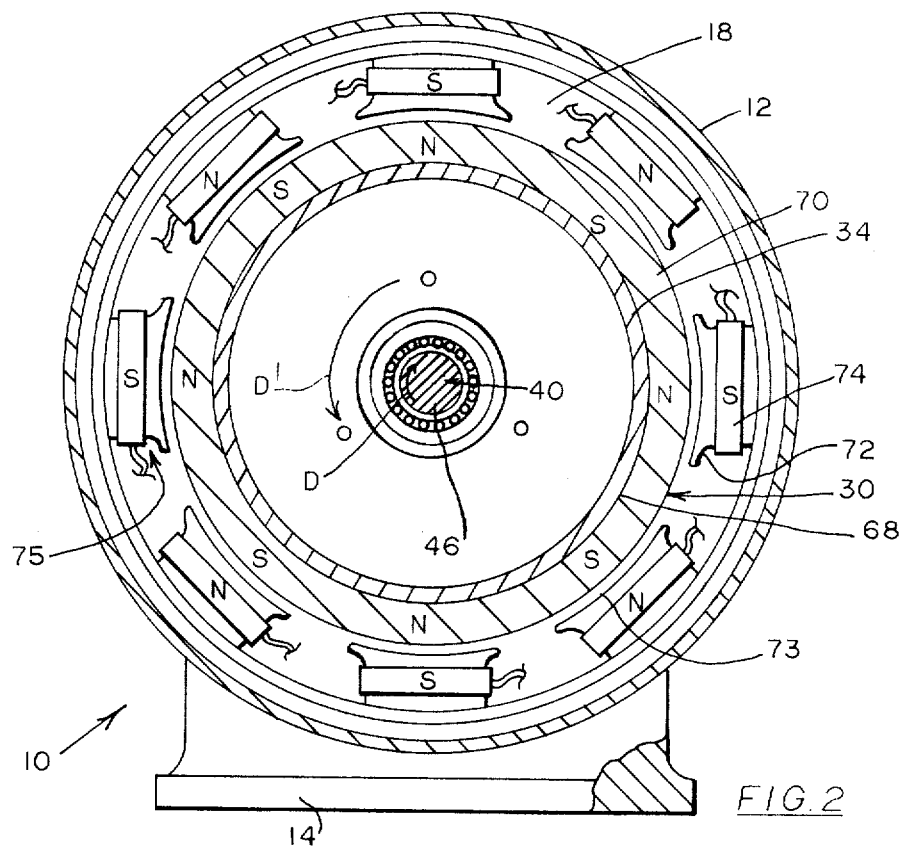
FIG. 2 is a transverse sectional view taken along line 2—2 of FIG. 1.

Referring now to the drawings wherein like reference characters designate like or corresponding parts throughout, there is illustrated in FIGS. 1 and 2 a motor assembly generally designated as reference numeral 10 having an outer cylinder housing or casing 12 with an integral pedestal 14. Opposite ends of the housing 12 are closed by respective circular heads 16, 18 which are held in place by a plurality of bolts 20. Rotatably journaled in a pair of ball bearings 22, 24 which are carried by the respective heads 16, 18 are respective hubs 26, 28 forming part of a rotating stator generally designated as reference numeral 30. Bolted to each of the hubs 26, 28 are respective end bells 32, 34 which carry a cylindrical array of magnetic field coils 36, which surround a squirrel cage rotor generally designated as reference numeral 40. A plurality of copper bars 42 of the rotor 40 are electrically joined together by end plates 44. A shaft 46 extends axially of the rotor 40 and is journaled in ball bearings 48, 50 which are carried by the respective hubs 26, 28. The shaft 46 has an outer end 46' extending outwardly of the head 18 for coupling to a load not shown. By this arrangement the rotating stator 30 and drive rotor 40 are rotatable with respect to each other inside of the housing 12. The hub 26 has a sleeve extension 52 which carries a plurality of spaced collector rings 54 on an insulated bushing 56. Each of the rings 54 is contacted by a brush 58 to which power supply wires 59 are connected which may be in turn connected to a three-phase alternating current source of fixed frequency not shown. Each of the brushes 58 is supported in a brush holder 60 mounted inside a cap 62 secured by a plurality of bolts 64 to the head 16. By this arrangement current can be conducted to the rotating stator coils 36 for magnetically acting on the bars 42 of the squirrel cage rotor 40 to rotate the same. This assembly constitutes a three-phase induction motor.

In order to effect adjustable retardation of the rotating stator 30 and consequently vary rotational speed of the drive rotor 40 when coupled mechanically to a load, there is provided elements of a magnetic torque transmission 75 of a type described in U.S. Pat. No. 2,779,548 issued Jan. 29, 1957 to R. Helmer. The elements of a magnetic torque transmission clutch 75 comprises a ring 70 of high hysteresis loss material mounted on a soulder 68 of the bell 34, which forms part of the rotating stator 30. Surrounding the ring 70 and spaced therefrom by an airgap 73 is a circumferential array of fixed pole pieces 72 made of soft iron. The pole pieces 72 carry coils 74 arranged so that the cores 72 are alternately magnetized N and S poles when the coils are connected to a direct current source (not shown).

Figure 3:
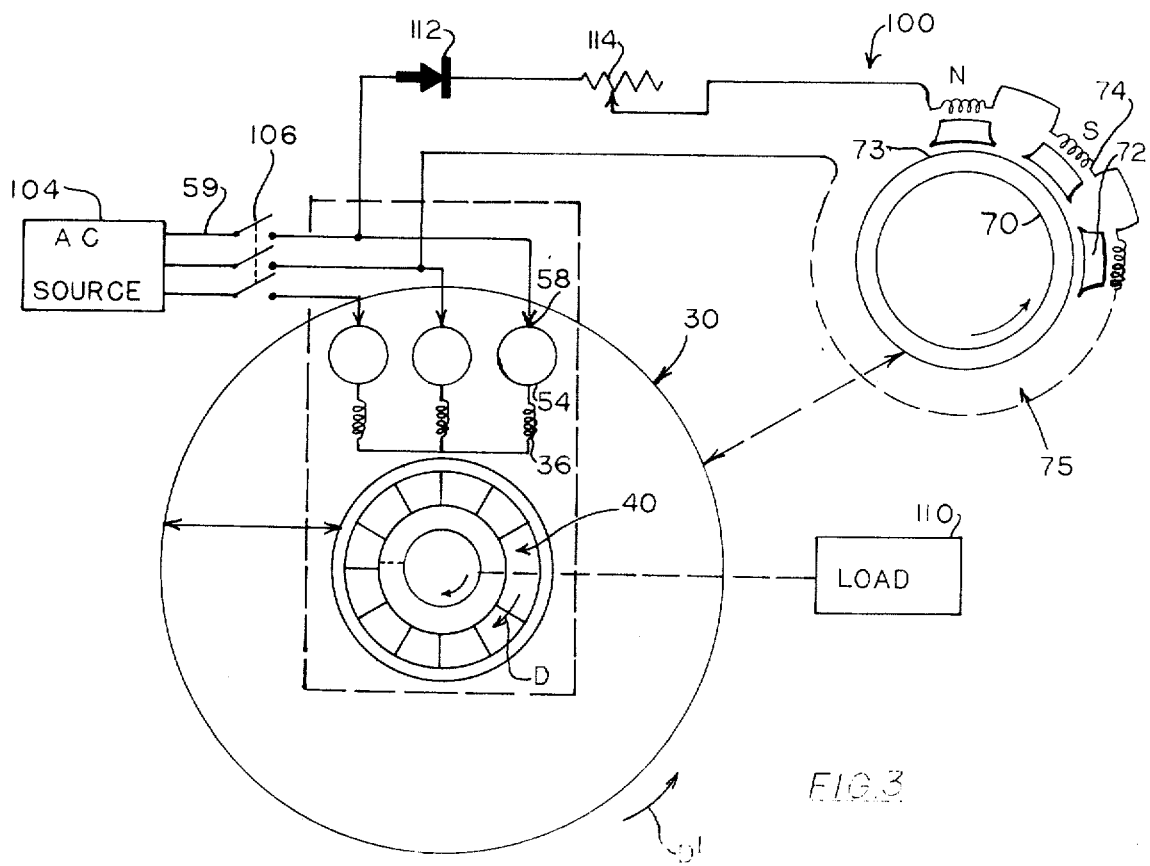
FIG. 3 is a schematic diagram of the assembly of FIG. 1 with associated power supply and load.

FIG. 3 shows one way the assembly of induction motor and the elements of a magnetic torque transmission 75 may be connected in an electrical circuit. In a circuit generally designated by reference numeral 100, the three-phase lines 59 of an alternating current source 104 are connected via a gang switch 106 to the brushes 58 which contact the rotary collector rings 54. The rings 54 are connected to the field coils 36 which rotate as part of the rotor 30. The coils 36 are arranged so that the rotating stator 30 reacting against the rotor 40 rotates in a direction D¹ which is opposite to a rotational direction D of the rotor 40. The rotor 40 is coupled to a mechanical load 110. Connected to one pair of the a.c. lines 59 in a single phase arrangement is a rectifier 112 and a potentiometer or rheostat 114. In series with the rectifier 112 and the rheostat 114 is a series arrangement of the coils 74 which magnetically react on ring 70 and tend to retard its rotation. The ring 70 rotates with and forms part of the rotating stator 30 as above mentioned. The coils 74 are energized by direct current due to rectifier 112, and the strength of the magnetic field set up in cores 72 is variable as the rheostat 114 is varied.

The manner in which the induction motor and the elements of a magnetic torque transmission cooperate to produce constant torque at load 110 regardless of the driving rotational speed of the rotor 40 will now be explained with reference to the drawings. Alternating current is applied to the collector rings 54 when a switch 106 is closed. Initially, while the rotor 40 is coupled to the load 110, the rotating stator 30 will rotate in the direction D'. The rheostat 114 is now adjusted to apply a direct current to the coils 74 of the magnetic torque transmission 75. This results in retarding the rotation of the rotating stator 30 and starts rotor 40 turning in direction D. It is possible to keep the rotating stator 30 rotating at all times when alternating current is supplied even when the motor drive shaft 46 is stationary. In any case the difference in speed of rotation between the rotating stator 30 and 40 will always be constant, for example: 1,800 r.p.m. regardless of the output drive speed. This insures that the output torque applied by the shaft 46 to load 110 will always be constant. By changing value of the direct current flowing through the coils 74, the speed of the rotating stator 30 may be varied. This speed change may be varied smoothly and continuously between zero r.p.m. and the maximum rated speed of the motor drive. Since the speed and the torque reaction on the rotating stator control are affected magnetically via the airgap 73, i.e. between the cores 72 and the ring 70, no mechanical wear occurs therebetween.

Figure 4:
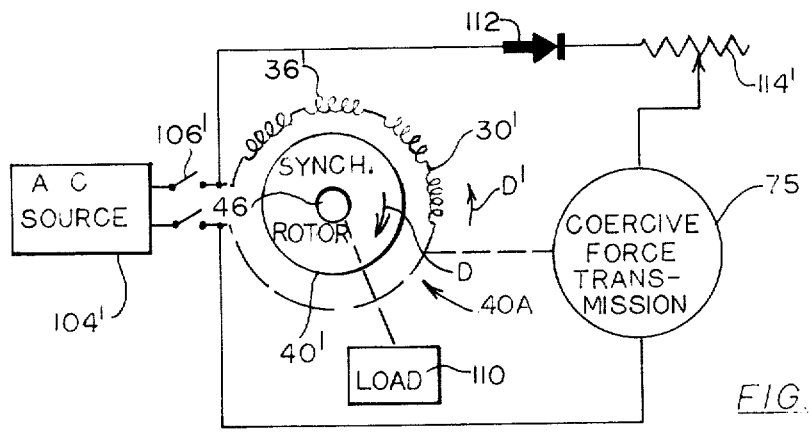
FIG. 4 is a diagram of another assembly including a synchronous motor and an electromechanical retarding means.

In the motor assembly described in FIGS. 1–3, a squirrel cage induction motor has been employed. However, it will be understood that it is possible to employ a synchronous motor in a similar manner. This is indicated diagrammatically in FIG. 4 where a rotor 40' of a synchronous motor 40A is controlled in speed by the elements of a magnetic torque transmission 75 associated with a rotating stator 30'. The rotor 40' drives the load 110. An alternating current source 104' energizes a plurality of coils 36' of the rotating stator 30' via a switch 106'. The transmission 75 is energized by a direct current via the rectifier 112' and a rheostat 114'.

Figure 5:
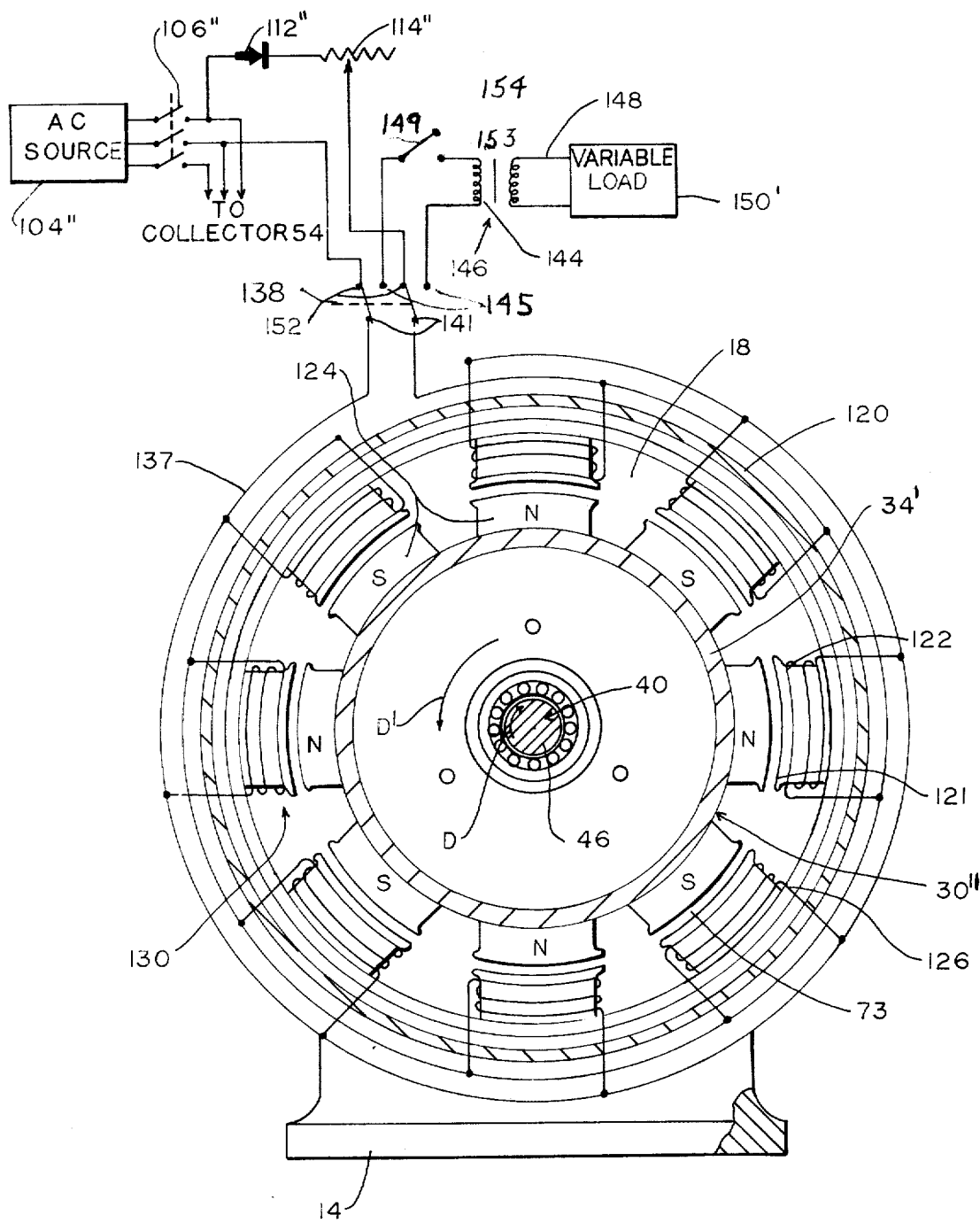
FIG. 5 is a diagram of a further assembly showing an alternator in place of the electromechanical means.

Referring now to FIG. 5, there is disclosed an alternator 130 which is used with the induction motor of FIG. 1 instead of the elements of a magnetic torque transmission 75. Thus the components of the induction motor are the same as those illustrated and described in conjunction with FIG. 1. The alternator 130 has an outer stator ring 120 with a plurality of poles 121 each having an energizable coil 122 surrounding each of the poles 121. The rotating stator 30'' has a magnetic ring 34' with a plurality of permanent north and south magnetic poles 124 designated alternately north and south. Each of the stator coils 122 is electrically connected to a pair of wires 126 which are connected via terminals 141 and a manual operable switch 138 to a pair of terminals 152 connected to an A.C. source 104'' via a rectifier 112'' and a rheostat 114''. A pair of terminals 145 of the switch 138 are connected to a primary 144 of a transformer 146 whose secondary 148 is connected to a variable electrical load 150'.

In operation, this embodiment functions similarly to the circuit description of FIG. 3. That is, alternating current is applied to the collector rings 54 when the switch 106'' is closed. With the switch 149 contacting a terminal 154, the rotating stator 30'' with the permanent magnets 124 rotates in direction D'. The switch 149 is now moved to terminal 153 and the switch 138 manually couples the terminals 141 to the terminals 145. An electrical resistance load 150' is applied to the coils 122 whereby rotation of rotating stator 30'' is retarded and rotor 40 starts turning in direction D. As more and more of the resistance load 150' is removed, the speed of the rotating stator 40 increases in the D direction and the speed of the rotor 30'' decreases in the D' direction. As in the previous embodiments, the difference in speed of rotation between the rotating stator 30'' and the rotor 40 will always be constant. Thus, in this embodiment the alternator 130 utilizes the excess energy to produce an A.C. current and power the load 150' rather than permitting the excess energy to be dissipated into heat as in the previous embodiments. When the speed of the rotor 40 approaches the maximum speed of the motor the manual switch 138 is operated to couple together terminals 141 and 152 whereby D.C. current is supplied to the stator coils 122 thereby locking or synchronizing the rotor 30'' with the stator ring 120.

All forms of the invention are characterized by oppositely rotating stator and drive rotors in a motor energized by an alternating current. The drive rotor is coupled to a mechanical load and its output speed is varied by varying the electro-mechanical load on the rotating stator while the output drive torque remains constant.

It should be understood that the foregoing relates to only a preferred embodiment of the invention, which have been by way of example only and that it is intended to cover all changes and modifications of the example of the invention herein chosen for the purposes of the disclosure, which do not constitute departures from the spirit and scope of the invention.

The invention claimed is:

1. An electric motor for driving a mechanical load comprising: a stationary housing; a first rotatable means wholly comprising the secondary of said motor extending axially of said housing and being rotatable in a selected direction for driving said load; a second rotatable means having slotted laminations and field coil windings therein surrounding said first rotatable means and extending axially in said housing for magnetically rotating said first rotatable means in one direction when said first rotatable means coupled to said load, a hardened high hysteresis steel ring being mounted on said second rotatable means for rotation therewith; said second rotatable means being rotatable in a direction opposite to that of said first rotatable means; control means comprising a plurality of electromagnets mounted on said stationary housing for retarding the rotation of said second rotatable means to vary the speed of rotation of said first rotatable means in said selected direction.

2. The electric motor according to claim 1 wherein said field coil windings are energized by alternating current, said electromagnets being energized by direct current.

3. The electric drive motor according to claim 1 wherein said electromagnets are mounted on said stationary housing and spaced a selected distance from said hardened steel ring.

4. The electric drive motor according to claim 1 wherein said electromagnets are alternately arranged north and south pole pieces.

5. An electric motor for driving a mechanical load comprising: a stationary housing; a first rotatable means wholly comprising the secondary of said motor extending axially of said housing for driving said load; a second rotatable means energizable by alternating current circumferentially surrounding said first rotatable means and extending axially in said housing for magnetically rotating said first rotatable means in one direction when coupled to said load, while said second rotatable means rotates by magnetic reaction in an opposite direction when energized by alternating current; and control means surrounding a portion of said second rotatable means for adjustably retarding rotation of said second rotatable means thereby varying the speed of rotation of said first rotatable means in said one direction.

6. An electric motor as defined in claim 5, wherein said control means is arranged to vary the speed of rotation of said first rotatable means at will from zero revolutions per minute up to the maximum rated drive speed of said first rotatable means, whereby said driving torque applied to said load is constant at all rotational speeds of said first rotatable means and whereby the difference in rotational speeds between said first and said second rotatable means is constant at all speeds of rotation of said first rotatable means.

7. An electric motor as defined in claim 6 further comprising a hardened steel ring and wherein said control means comprises a plurality of stationary electromagnets carried by said housing the hardened steel ring being integral with the said second rotatable means and arranged to react magnetically with a stationary portion for selectively and adjustably retarding rotation of said second rotatable means to drive said first rotatable means in said one direction.

8. An electric motor as defined in claim 7, wherein said first rotatable means is a squirrel cage and constitutes the rotor of an induction motor.

9. An electric motor as defined in claim 7, wherein said first rotatable means is of a salient pole type to constitute the rotor of a synchronous motor.

10. An electric motor as defined in claim 7, wherein said stationary portion is an assembly of coils wound on cores of soft iron and wherein said rotatable portion is a ring of high hysteresis loss magnetic material.

11. An electric motor as defined in claim 10, wherein said control means further comprises: a source of direct current, and a variable resistance connected in series with said source of direct current for varying the direct current passing through said coils to vary the retardation of said second rotatable means and therefore the rotational speed of said first rotatable means.

12. An electric motor as defined in claim 5 wherein said motor is connected to a source of alternating current of fixed frequency wherein said motor can provide a variable speed constant torque output.

* * * * *